United States Patent [19]

Hirano et al.

[11] Patent Number: 4,745,458
[45] Date of Patent: May 17, 1988

[54] TELEVISION SIGNAL PROCESSING SYSTEM

[75] Inventors: Yasuhiro Hirano, Hachioji; Hiroshi Yoshigi, Nishitama; Takahiko Fukinuki; Hidehiko Jusa, both of Kokubunji, all of Japan

[73] Assignee: Hitachi, Ltd., Tokyo, Japan

[21] Appl. No.: 799,510

[22] Filed: Nov. 19, 1985

[30] Foreign Application Priority Data

Nov. 21, 1984 [JP] Japan .............................. 59-244433
Dec. 7, 1984 [JP] Japan .............................. 59-257523
Dec. 14, 1984 [JP] Japan .............................. 59-262763

[51] Int. Cl.$^4$ .............................................. H04N 9/42
[52] U.S. Cl. ...................................... 358/11; 358/105; 358/140
[58] Field of Search ............... 358/31, 105, 12, 11, 358/13, 39, 36, 141, 133, 142, 140

[56] References Cited

U.S. PATENT DOCUMENTS 3,715,483 2/1973 Limb et al. ...................... 358/133
4,485,401 11/1984 Tan et al. ........................ 358/141
4,551,753 11/1985 Nishizawa et al. ............. 358/140

FOREIGN PATENT DOCUMENTS 0077782 5/1984 Japan ............................. 358/31
0171386 9/1984 Japan ............................. 358/31
0086994 5/1985 Japan ............................. 358/142

OTHER PUBLICATIONS

Fukinuki et al., "Extended Definition TV Fully Compatible with Existing Standards", IEEE, vol. Com-32, No. 8, 8/84, pp. 948-953.
Fukinuki et al., "Experiments on Proposed Extended-Definition TV with Full NTSC Compatibility", SMPTE Journal, 10/84, pp. 923-929.

*Primary Examiner*—James J. Groody
*Assistant Examiner*—David E. Harvey
*Attorney, Agent, or Firm*—Antonelli, Terry & Wands

[57] ABSTRACT

In a color television signal processing system for converting a scanning signal sequentially scanned in the transmitting side into an interlace-scanned television signal in order to obtain a high-quality color television picture, said system is arranged to detect information related to picture motion and that concerning to a spatio-temporal frequency characteristic and to control a characteristic of a spatio-temporal filter for transmitting a luminance signal on the basis of this information and to transmit the signal expressing the information multiplied with the color television signal.

5 Claims, 10 Drawing Sheets

| FILTER-22 | FILTER-19 | FILTER-20 | FILTER-21 | Y. LIMIT | Y.C. MODE |
|---|---|---|---|---|---|
| 0 | φ | φ | φ | NO | M1 |
| 1 | 0 | φ | φ | NO | M2 |
| 1 | 1 | 0 | φ | NO | M3 |
| 1 | 1 | 1 | 0 | NO | M3 |
| 1 | 1 | 1 | 1 | YES | M4 |

TELEVISION SIGNAL PROCESSING SYSTEM

BACKGROUND OF THE INVENTION (1) Field of the Invention

The present invention is related to a television signal processing system and more particularly to a system for processing a color television signal which can easily realize processing for obtaining a high quality picture in a receiver by means of accomplishing certain processing for a transmitting television signal on the basis of information related to image movement when generating a television signal for transmission.

(2) Description of Prior Art

In the present television signal processing system, various designs have been developed for transmitting picture information in a limited transmission band and obtaining adequate picture quality. For example, for scanning, there is the interlace scan wherein scanning lines of adjacent frames are between scanning lines of other frames. Further, an NTSC television system serves to multiply a chrominance signal on a frequency band of a luminance signal.

At present, there are proposed some methods for improving picture quality in a TV receiver, but there are some cases where the above-stated conventional television signal system techniques are a hindrance to improving picture quality, contrary to expectations.

For a high resolution television signal system which can retain the transmission band and the signal form of a conventional television signal and at the same time, receive and transmit a high-resolution picture, there is proposed a method having a full-compatibility with the present standard (European Patent Application, Application No. 841026958 Publication No. 0120,390 "Television signal transmission system").

This television signal processing system is designed to ameliorate picture quality by the method wherein, on the transmitting side, high-band frequency components of a luminance signal over a transmission band are frequency-converted as high resolution information and are then inserted in a gap between spectra of the conventional television signal so as to multiply the frequency for generating a television signal and, on the receiving side, these high-band frequency components are separated and regenerated so as to regenerate a wide band of a luminance signal. However, as stated after in detail, this system is very effective for a still picture but the quality of a moving picture is quite inferior since the picture originally belonging to a low frequency of luminance signal $Y_L$ is converted to a high frequency signal as high resolution information and is erroneously regenerated.

Namely, this known system has the disadvantage that a low-band frequency luminance signal in relation to a moving picture is erroneously regenerated as high resolution information so that the picture quality is adversely affected.

Furthermore, for a system for improving TV picture quality, there exists a processing system for obtaining a high quality picture by means of employing interpolating techniques for an interlace-scanned signal, doubling the number of scanning lines and converting the interlace-scanned signal into a line sequential scanning signal. But because of interpolation, this system is ineffective for improving picture quality of a moving picture.

Thus, there is known the technique wherein a detecting section for moving images is provided in a television receiver and signal processing is controlled in accordance with picture motion. However, since a motion detecting circuit is provided on the receiving side, such a television receiver is costly.

SUMMARY OF THE INVENTION

It is a main object of the present invention to realize a television signal processing system which serves to ameliorate picture quality even when the image is moving.

It is another object of the present invention to realize a television signal processing system which can provide simple construction for a control device for a television receiver in accordance with the picture motion.

In order to achieve the above-stated objects, the present invention is designed to, on the transmitting side of a television signal, detect the picture motion from a scanning signal, process a television signal with the information expressing this motion and transmit it.

The processing of a television signal means passing a scanning signal through a filter which has its characteristics varied by the motion information or adding a signal expressing the information for separating the motion forms to a transmitting television signal.

In the television signal processing system in the present invention, the television signal to be transmitted has already undergone certain processing in accordance with picture motion. Thus, in the television receiver, there can be economically realized a processing circuit for detecting motion when changing a processing pattern of a signal in accordance with picture motion. Further, picture quality can be ameliorated, eliminating the adverse effect of picture motion.

The above stated and the other oblects and features of the present invention will be further obvious from the following description accompanying the drawings.

DETAILED DESCRIPTION OF EMBODIMENTS

Figure 1:
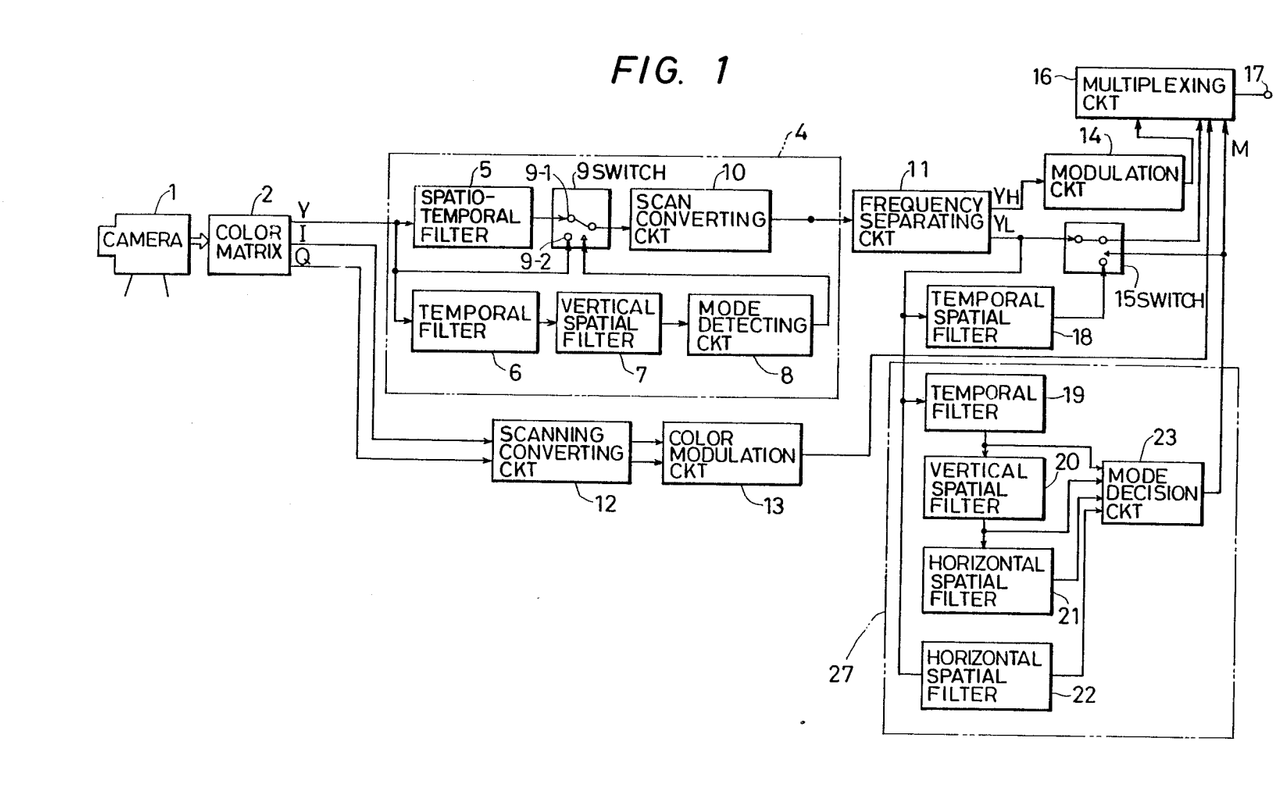
FIG. 1 is a block diagram showing the construction of one embodiment of a transmitting section of a color television signal processing system according to the present invention.

FIG. 1 is a block diagram showing the construction of one embodiment of a television signal processing system according to the present invention. This embodiment is a circuit for converting a scanning signal genetated by sequentially scanning a picture by 60 frames per one second and 525 scanning lines per one frame into an interlace-scanned picture signal which has 30 frames and 60 fields per one second and 525 scanning lines per one frame, similar to a conventional television signal.

Picture information is converted into a sequentially-scanned scanning signal which has 60 frames per one second and 525 scanning lines per one frame by means of a camera 1. Said scanning signal is converted into a luminance signal Y and 2 color difference signals I and Q through a color matrix circuit.

The luminance signal Y is added to a mode detecting circuit 8 through a temporal filter 6 and a vertical spatial filter 7.

The mode detecting circuit serves to detect the picture motion by an aliasing component of spectrum signal on the basis of the below-stated reasons. When said aliasing component is detected, a switch terminal of a switching circuit 9 is turned to the 9-1 side and the luminance signal Y is added to a scan converting circuit 10 through spatio-temporal filter 5. When said aliasing component is not detected, the switch terminal of the switching circuit 9 is turned to a 9-2 side and the luminance signal Y is directly added to said scan converting circuit 10.

Figure 2A:
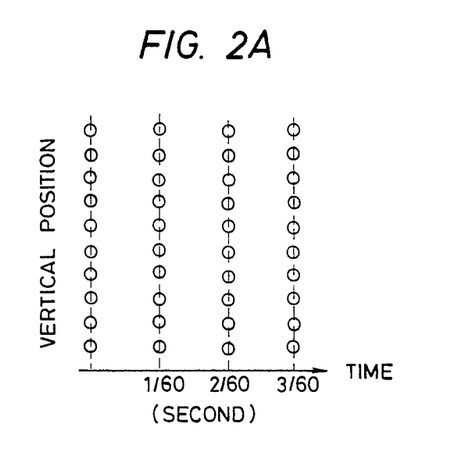
FIGS. 2A and 2B are illustrations for describing a sequential scanning signal and an interlace scanning signal.
Figure 2B:
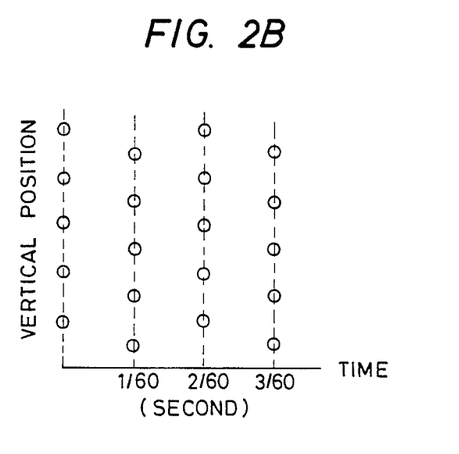

Said scan converting circuit 10 denotes a circuit for converting a signal of a scanning line shown in FIG. 2A into a signal of a scanning line shown in FIG. 2B and comprising memory circuits. More particularly, a signal, having 60 frames per second and 525 scanning lines per frame is written at a certain speed in one of two line memories as thinning out the scanning lines on alternate lines. The signal is read out from the other line memory half as fast as it is written. When these two line memories are alternately switched at a horizontal scanning period of a converted signal, the signal becomes the familiar interlace-scanning signal with one frame/two fields as shown in FIG. 2B.

Figure 3:
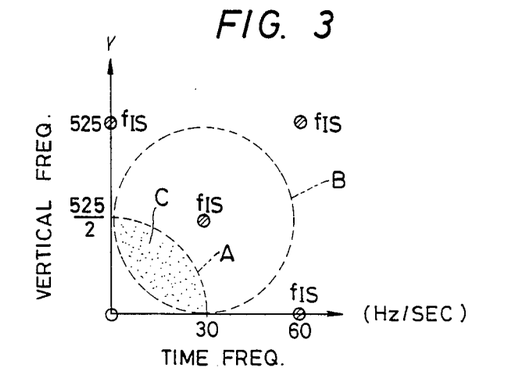
FIG. 3 is a spatio-temporal frequency characteristic view describing aliasing noise caused by the scanning line conversion.

FIG. 3 shows a signal spectrum distribution of an interlace-scanned scanning signal as shown in FIG. 2B. In this FIG., the abscissa denotes the temporal frequency of a picture. The ordinate denotes a spatio-frequency in the vertical direction of the picture. The interlaced scanning lines with a frame period 1/30 sec., a field period 1/60 sec. and the number of scanning lines of a field 525/2 can be regarded as the sampling of picture information by a sampling frequency $f_{IS}$ of $f=525/2$ and $v=525/2$ in the two-dimensional frequency area having said temporal frequency f and vertical spatial frequency $v$. Thus, when the signal spectrum obtained by sequentially-scanning with 525 lines and 60 frames is in the range enclosed by the dotted line A, when it is converted to interlace scanning simply by thinning out scanning lines, the signal spectrums overlap in the area C shown by dots so that a, aliasing noise, occurs. As a result, signal quality is adversely affected.

Figure 4A:
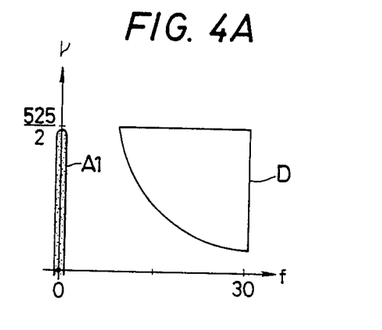
FIGS. 4A to 4F are spatio-temporal frequency characteristic views for describing the operation of FIG. 1.
Figure 4B:
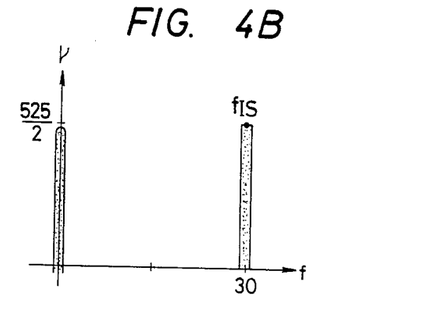
Figure 4C:
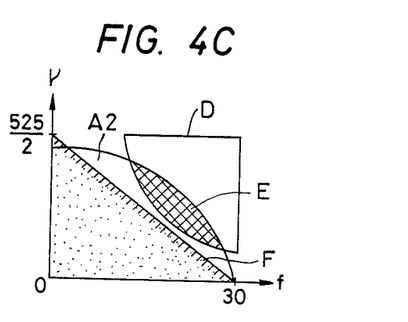
Figure 4D:
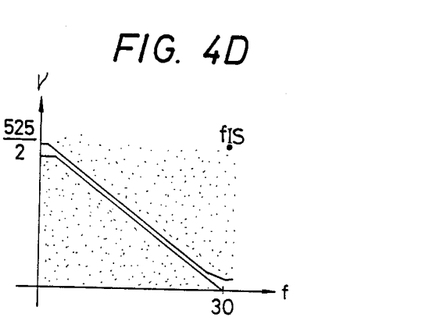
Figure 4E:
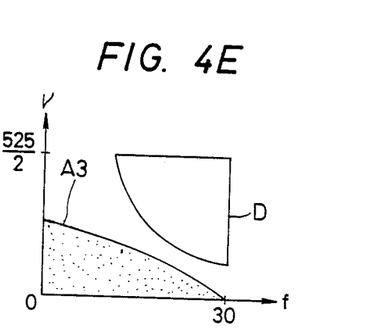
Figure 4F:
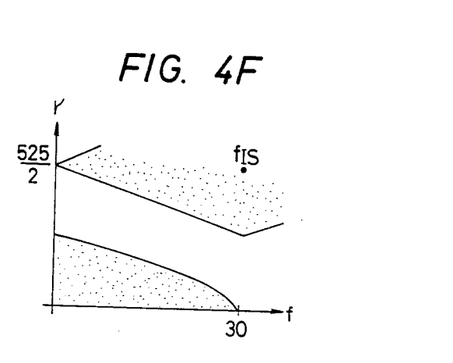

FIGS. 4A, 4B, 4C, 4D, 4E and 4F are respectively spatio-temporal frequency characteristic views similar to FIG. 3. They are separately shown as a still picture (FIGS. 4A and 4B) a slowly-moving picture (FIGS. 4C and 4D) and a rapidly-moving picture (FIGS. 4E and 4F).

In this Figure, the area D denotes an area for detecting an aliasing component. The signal spectrum in this area is detected by means of the signal passed through the temporal filter 6 and the vertical spatial filter 7 shown in FIG. 1. As shown in FIGS. 4A, 4C and 4E, the signal spectra A1 and A3 do not exist in the area for detecting the aliasing component. Further, as shown in FIG. 4C, in case of a slowly-moving picture, a part E of the signal spectrum A2 depends upon the aliasing component area D. Such a spectrum component E is made to be aliasing noise by sampling it at the sampling frequency $f_{IS}$ as described in FIG. 3.

Figure 5A:
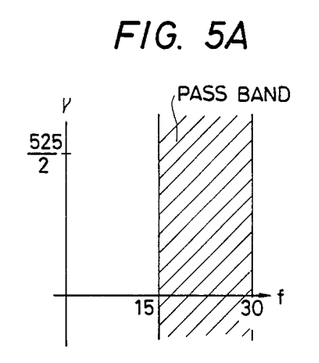
FIGS. 5A and 5B are spatio-temporal frequency characteristic views respectively showing a temporal filter 6 and a vertical spatial filter 7.
Figure 5B:
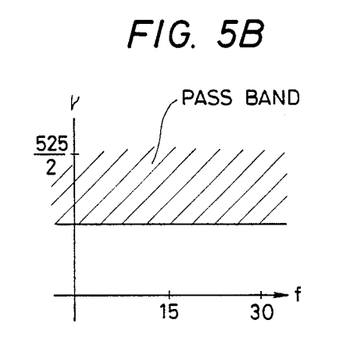

Accordingly, the characteristics of said temporal filter 6 and vertical spatial filter 7 are respectively made.to be those of passing a 15 to 30 Hz of component in the temporal frequency therethrough and of passing a component of over 525/2 vertical frequency therethrough as shown in FIGS. 5A and 5B. Thus, the signal spectrum in the area D for detecting an aliasing component can be detected. Namely, the overlapped area of pass bands of FIGS. 5A and 5B is almost equal to the area D shown in FIG. 4.

The amplitude of the aliasing component in the detected signal spectrum is detected to be greater than a certain level or not by means of the mode detecting circuit 8. Further, when the mode detecting circuit 8 detects that there exists an aliasing component, it serves to control the switch 9 so as to select the signal of the spatio-temporal filter 5. Conversely, when it detects that there exists no aliasing component, it serves to select the signal which is not passed through the spatio-temporal filter 5 so as to generate a switch-controlling signal.

The spatio-temporal filter 5 serves to pass the signal in the area F shown by oblique lines in FIG. 4C, that is, in the triangle composed of three points of an origin 0, a temporal frequency 30 and a vertical spatial frequency 525/2.

Accordingly, when the picture moves slowly, the switch is turned to the 9-1 side terminal and thus the scanning signal of the picture is band-limited.

The scan converting circuit 10, as stated before, serves to lengthen the time base by thinning out scanning lines on alternate lines. It means that sampling is carried out by means of a sampling frequency $f_{IS}$ with 30 Hz of temporal frequency and 525/2 of vertical spatial frequency. The above-stated signals shown in FIGS. 4A, 4C and 4E are respectively made to be the signals of the signal spectra shown in FIGS. 4B, 4D and 4F. In each case, no aliasing noise is generated.

Figure 6:
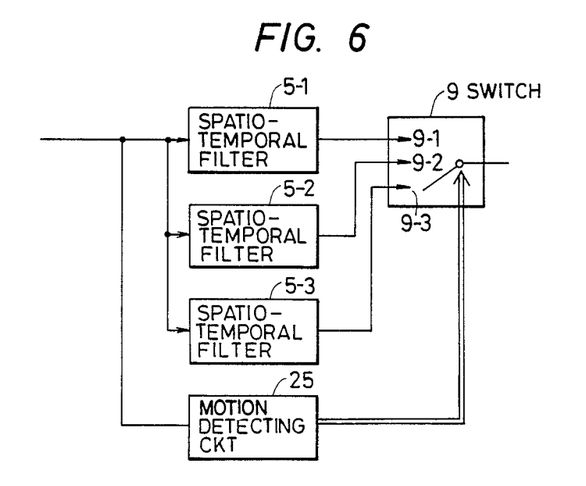
FIG. 6 is a block diagram showing one embodiment of a motion-detecting circuit and a spatio-temporal filter.
Figure 7A:
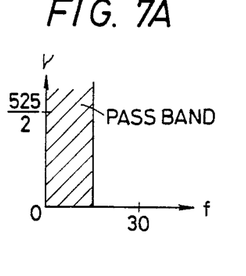
FIGS. 7A, 7B and 7C are spatio-temporal frequency characteristic views respectively showing spatio-temporal filters 5-1, 5-2 and 5-3.
Figure 7B:
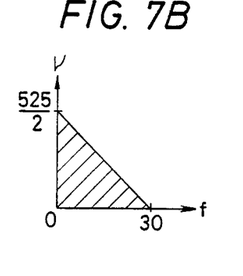
Figure 7C:
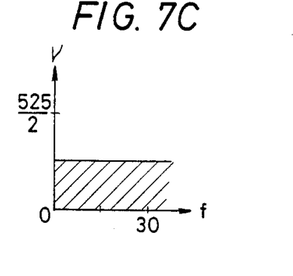

In the above-stated embodiment shown in FIG. 1, the information related to picture motion is extracted by detecting the aliasing components of the signal. FIG. 6 shows another embodiment comprised of a spatio-temporal filter B and a motion detecting circuit. In this embodiment, spatio-temporal filters 5-1, 5-2 and 5-3 are connected with one another in parallel and respectively have spatio-temporal frequency characteristics shown in FIGS. 7A, 7B and 7C. The motion detecting circuit 25 detects the amount of motion by computing the signals in the previous frame and the current frame and controls the switch 9 to select the spatio-temporal filter 5-1 when the picture is detected to be a still or a semi-still image, the spatio-temporal filter 5-2 when it is identified as a slowly-moving picture and the spatio-temporal filter 5-3 when it is identified as a rapidly-moving picture.

Further, a spatio-temporal filter can be also realized by changing the mixture ratio of the spatio-temporal filters 5-1 and 5-3 to correspond to the amount of motion.

Figure 8A:
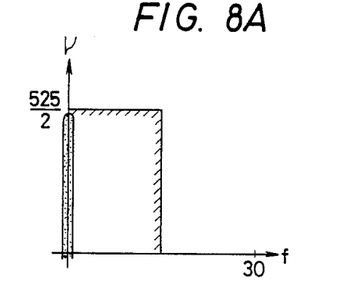
FIGS. 8A, 8B, 8C, 8D, 8E and 8F are spatio-temporal frequency characteristic views for describing the operation of the circuit shown in FIG. 6.
Figure 8B:
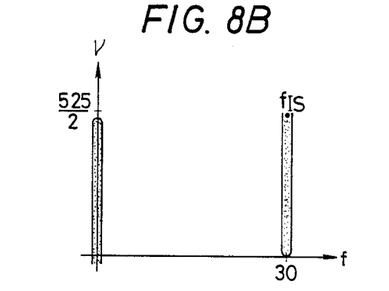
Figure 8C:
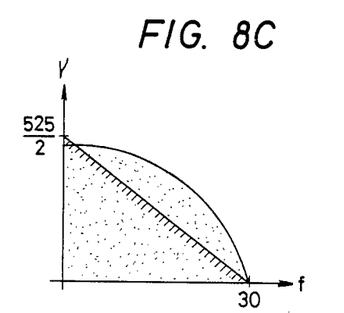
Figure 8D:
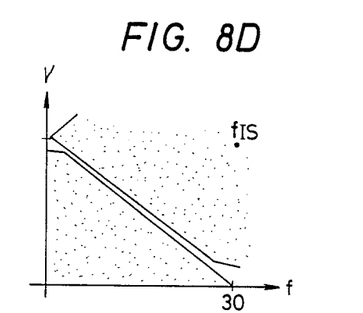
Figure 8E:
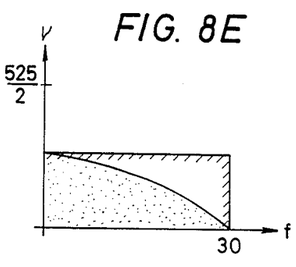
Figure 8F:
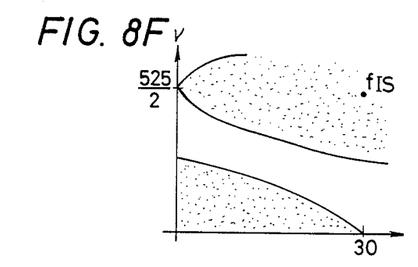

FIGS. 8A, 8C and 8E respectively show the signal spectra (area shown by dots) identical with those shown in FIGS. 4B, 4C and 4E and the characteristics of the spatio-temporal filters selected to correspond to each motion. FIGS. 8B, 8D and 8F respectively shows the signal spectrums caused when the outputs of the filters 5-1, 5-2 and 5-3 are converted into interlaced scanning signals by the scan converting circuit. With this conversion, the aliasing noise can be removed.

Turning to FIG. 1, the interlace-scanned luminance signal, which is the output of the scan converting circuit 10, is separated into a low-band luminance signal $Y_L$ below the transmission band of a television signal and a high-band luminance signal $Y_H$ over the transmission band thereof by means of a frequency separating circuit 11. The luminance signal $Y_H$ is converted into the signal $Y_H'$ within said transmission band (for example, below 4.2 MHz) by means of a modulation circuit or frequency converting circuit 14 and then is multiplied with the luminance signal $Y_L$ by means of a multiplexing circuit 16.

This arrangement is designed to transmit a wider band signal than the conventional television signal and to obtain a high resolution picture and the principle and arrangement thereof have already been made known in the documents stated before. Thus, the detailed description thereof is deleted. Of course, there is no need of the modulation circuit 14 in case of not transmitting a high resolution signal.

A block 27 enclosed in a dotted line denotes the section for detecting the quality of a picture, especially the motion thereof on the basis of the spatio-temporal frequency characteristic of the luminance signal $Y_L$ and for generating a signal for driving a switch 15 switching whether the luminance signal $Y_L$ passes through a spatio-temporal filter 18 or not and a mode code M expressing said quality of a picture.

Figures 9, 10, 11A, 11B, 11C, 12:
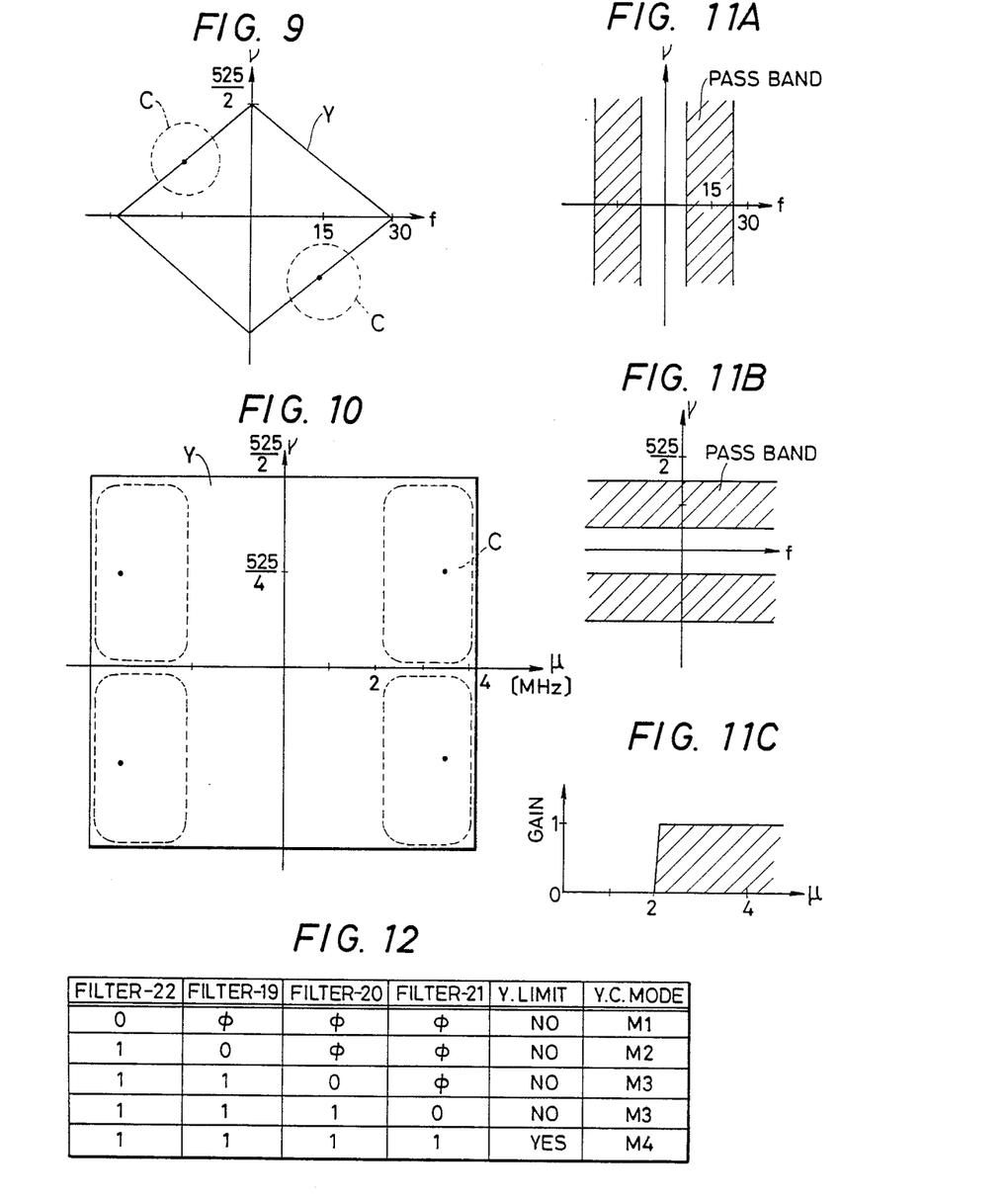
FIG. 9 is a spatio-temporal frequency characteristic view of a color television signal.
FIG. 10 is a horizontal-vertical spatial frequency characteristic view of a color television signal.
FIGS. 11A, 11B and 11C are respectively frequency charectristic views of filters 20, 21 and 22.
FIG. 12 is an explanatory view showing the operation of a mode detect or circuit 23.

The two-dimensional frequency of a temporal frequency f and a vertical spatial frequency $\nu$ of the low-band luminance signal $Y_L$ is disturbed in the area enclosed in the line Y of FIG. 9. Further, C denotes a spectrum area of a modulated chrominance signal.

Further, the two-dimensional frequency of a horizontal spatial $\mu$ frequency and a vertical spatial frequency $\nu$ can be expressed as shown in FIG. 10.

A temporal filter 19, a vertical spatial filter 20 and a horizontal spatial filter 21 are longitudinally connected with one another. The luminance signal $Y_L$ is given to the filter 19 and the outputs of respective filters 19, 20 and 21 are given to a mode decison circuit 23. Further, the horizontal spatial-filter 22 has an input of the luminance signal $Y_L$ and the output thereof is given to said mode decision circuit 23.

FIG. 11A denotes a filter characteristic of the temporal filter 19, which passes a temporal frequency signal near 15Hz, that is, oblique parts.

FIG. 11B denotes a filter characteristic of the vertical spatial filter 20, which passes a signal nearby 525/4 of the vertical spatial frequency, that is, oblique parts. And FIG. 11C denotes a filter characteristic of the horizontal spatial filters 21 and 22, which pass a signal over 2 MHz of the horizontal spatial frequency, that is, an oblique part.

FIG. 12 is an explanatory view showing the operation of the above-stated mode decision circuit 23.

The rows of FILTER-19, FILTER-20, FILTER-21 and FILTER-22 respectively denote the outputs of the filters 19, 20, 21 and 22 shown in FIG. 1, where "1" means there exists an output over a certain value, "0" means there exists no output below a certain value and "$\phi$" means either one of "0" and "1" can be good. A control signal is generated for connecting the switch 15 to the output side of the spatio-temporal filter 18 only in case of "YES" of "Y. LIMIT". In case of "NO" thereof, the switch 15 is connected to the output side of the frequency separating circuit 11. The "Y.C. MODE" row denotes the four states of the outputs of the filters 19, 20, 21 and 22. These states are expressed by the signals $M_1$, $M_2$, $M_3$ and $M_4$. The signal M expressing these modes is multiplied with a scanning signal by means of the multiplexing circuit 16. This mode signal should be multiplied during, for example, a vertical blanking period.

In addition, in FIG. 1, there is shown the embodiment wherein the motion detecting circuits 6, 7 and 8 and the other motion detecting circuits 19, 20 . . . 23 are separately composed, but it is possible to compose them by using the circuits available for both.

Hereinabove, the luminance signal Y has been stated. Of the scanning signals, the color difference signals I and Q from the color matrix circuit 2 are sequentially converted to the interlace-scanned signal by means of a scan converting circuit 12, similarly with the scan converting circuit 10. Then, it is modulated to a modulated chrominance signal by means of a color modulation circuit 13 and further is multiplied to a luminance signal by means of the multiplexing circuit 16.

Accordingly, as the output of the multiplexing circuit 16, a video signal of a color television signal is output. This video signal is different from the conventional video signal. It means that the aliasing noise of the luminance signal is removed. And it includes high-resolution picture information and a mode signal expressing a picture quality.

Figure 13:
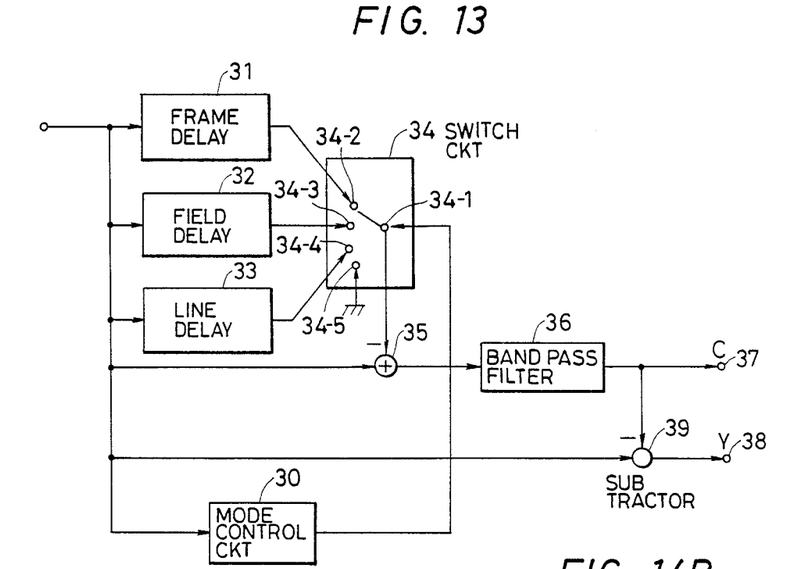
FIG. 13 is a block diagram showing one embodiment of a separating circuit for a luminance signal and a modulated chrominance signal in a color television receiver.

FIG. 13 shows the embodiment of a Y.C. separating circuit for separating the video signal into the luminance signal and the modulated chrominance signal after receiving the color television signal generated by the above-stated embodiment shown in FIG. 1. The Y.C. separating circuit of the present embodiment serves to separate the video signal into the luminance signal and the chrominance signal so as not to generate a cross-color caused by detecting the luminance signal component as the chrominance signal component and a cross-luminance caused by detecting the chrominance signal component as the luminance signal component, irrespective of picture quality (presence or absence of the motion).

A mode control circuit 30 serves to separate said mode signal M from the video signal and to convert the mode signal M to a switch-controlling signal for the switch 34.

Figure 14A:
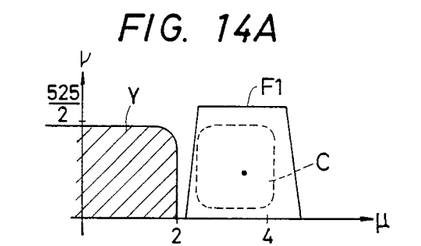
FIGS. 14A, 14B, 14C, 14D, 14E and 14F are respectively frequency characteristic views of video signals.

When the mode signal is M1, that is, there is no output of a high pass filter 22 with a high-band pass characteristic shown in FIG. 11, the spatio-frequency characteristic of the luminance signal is a signal spectrum as shown in Y of FIG. 14A. Thus, when a switch 34 connects a terminal 34-1 to a terminal 34-5, the separated modulated chrominance signal C is output at an output terminal 37 of a band pass filter 36 having a band pass chracteristic as shown in $F_1$ of FIG. 14A. A subtractor 39 serves to subtract the separated signal C from the video signal so as to obtain a separated luminance signal Y at an output terminal 38.

Figure 14B:
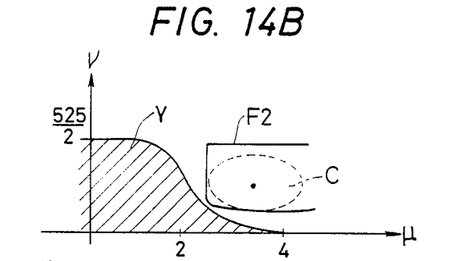
Figure 14C:
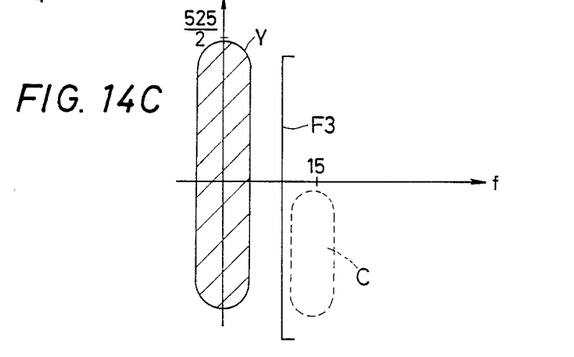

When a mode signal M2 exists, that is, an output of the high pass filter 22 with the characteristics shown in FIG. 11C and at the same time no output of the temporal filter 19 exists with the characteristics shown in FIG. 11A, the frequency characteristics of the luminance signal Y is a signal spectrum as shown in FIG. 14C. Thus, when the switch 34 connects the terminal 34-1 to a terminal 34-2, an overall characteristic of an adder 35, and a band-pass filter 36 is made to be the characteristic $F_3$ as shown in FIG. 14C and thus the modulated chrominance signal is separated from a video signal. The subtractor 39 serves to subtract said separated signal C from the video signal, and as a result, the separated luminance signal can be obtained at the output terminal 38.

Similarly, when a mode signal M3 is detected, the spatio-temporal frequency characteristics of the luminance signal Y are made to be Y as shown in FIG. 14B. At this time, the connection of the terminal 34-1 to the terminal 34-4 in the switch 34 serves to arrange a filter for transmitting the area $F_2$ shown in FIG. 14B comprised of the line delay circuit 33, the subtractor 35 and the band-pass filter 36. Thus, the modulated chrominance signal C is separated from the luminance signal.

Figure 14D:
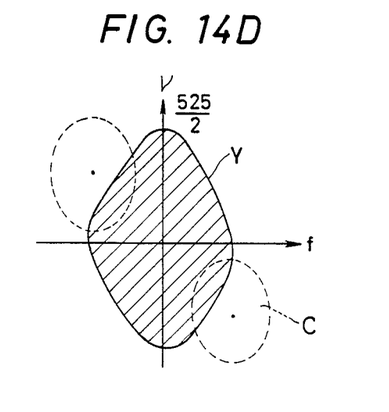
Figure 14E:
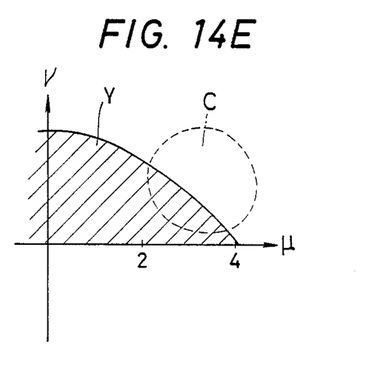
Figure 14F:
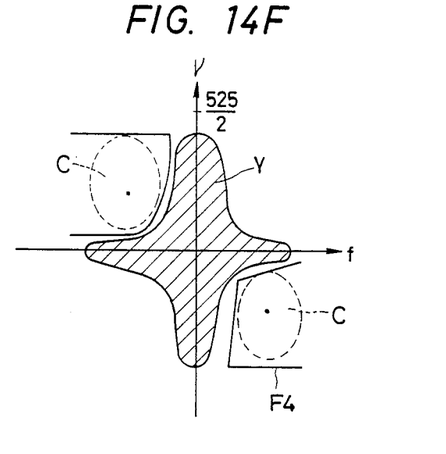

Further, when a mode signal M4 is detected, it means the luminance signal originally has frequency characteristics as shown in FIGS. 14D and 14E. However, in this case, since "Y. LIMIT" in FIG. 12 is "YES", the switch 15 shown in FIG. 1 is turned to the spatio-temporal filter 18 side so that the frequency of the luminance signal is varied as shown in Y of FIG. 14F. Thus, the modulated chrominance signal is separated by transmitting a video signal through a filter with the characteristic as shown by F4. Accordingly, when the mode signal M4 is detected, the switch 34 donnects the terminal 34-1 to 34-3 so as to obtain a difference signal between fields. By transmitting this signal through the band-pass filter 36, a filter characteristic as shown in F4 of FIG. 14F can be obtained. As a result, a color signal can be separated.

As described above, detecting a mode signal and switching the switch 34 semes to realize optimal Y.C. separation in response to a picture frequency characteristic by using a simple circuit.

Figure 15:
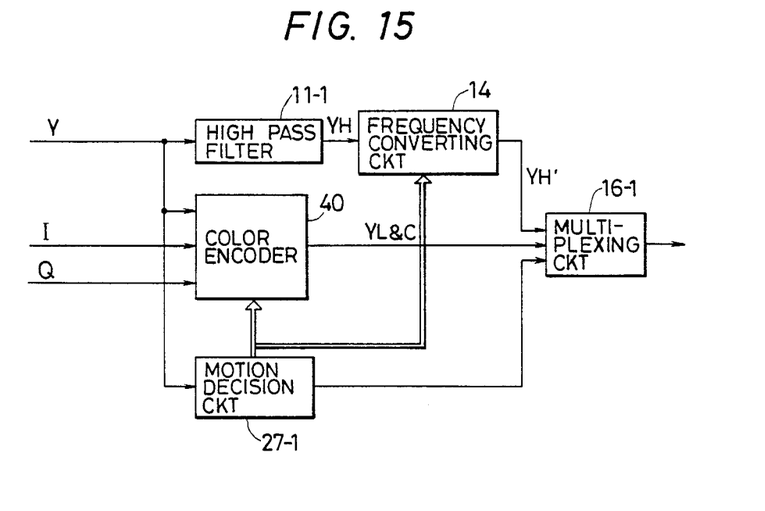
FIG. 15 is a block diagram showing one embodiment of a transmitting section of a color television signal processing system according to the present invention.

FIG. 15 is a block diagram showing the arrangement of another embodiment of a color television signal processing circuit according to the present invention. In this Figure, a high pass filter 11-1 can transmit a high frequency component $Y_H$ over a certain frequency (for example, 4.2 MHz). A frequency converting circuit 14 is arranged to inhibit output of existing picture motion by means of a control signal from a motion detecting circuit 27-1, similarly with the function of the frequency converting circuit in FIG. 1. A color encoder 40 is equivalent to the section generating a video signal in the conventional color television and corresponds to the area from the section of inputting inputs I and Q of the color modulation circuit 13 and the luminance signal $Y_L$ of the frequency separating circuit 11 to the section of multiplying the output of the switching circuit 15 with the output of said circuit 13, as shown in FIG. 1.

The motion detecting circuit 27-1 serves to decide if the picture is still or moving on the basis of the luminance signal and, in case of a moving picture, serves to control the output of the frequency converting circuit 14 to be zero. Further, the multiplexing circuit 16-1 serves to multiply information showing which mode of a still picture or a moving one. This mode information is applied during, for example, a vertical blanking period of a television signal. Further, the motion detecting circuit 27-1 serves to decide that the picture is a moving one if the difference between frames of a luminance signal goes over the threshold level, if the component over the threshold level is detected in the area of a $Y_H'$ component of a temporal and vertical two-dimensional frequency area and the like.

Moreover, the encoder circuit 40 also serves to limit the band of a luminance signal to correspond with the mode of a still picture or a moving one.

Figure 17A:
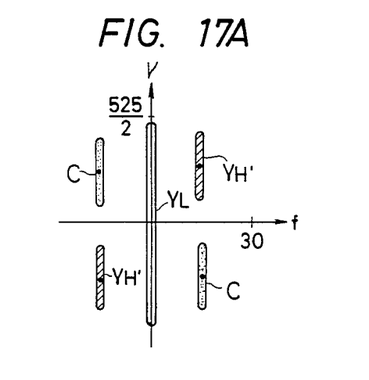
FIGS. 17A and 17B are spatio-temporal frequency characteristic views for describing the operations of said FIGS. 15 and 16.
Figure 17B:
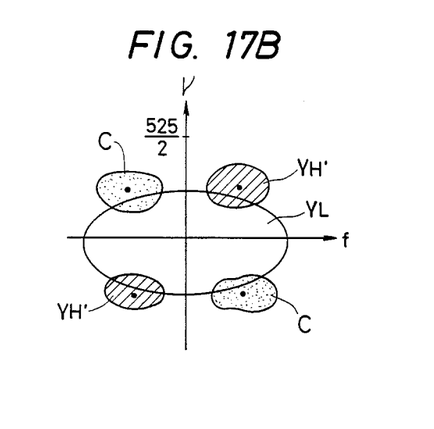

FIGS. 17A and 17B are signal spectrum graphs of a color television signal for explaining the operation of said FIG. 15 and respectively denote the cases of a still picture and a moving picture. In the still picture, as shown in FIG. 17A, the luminance signal is on an axis and the chrominance signal and the high resolution information is in parallel with the axis. However, in the moving picture, as shown in FIG. 17B, the spectrum is spread toward the time base.

The luminance signal $Y_L$, the chrominance signal C and the high resolution information signal $Y_H'$ as stated above can be respectively separated by a spatio-temporal filter in a receiver, but in this case, it is not possible to avoid the phenomenon in which the $Y_L$ component is leaked into the $Y_H'$ component in the cut-off area of the filter.

On the other hand, a high-band component of a luminance signal used as high resolution information is important for regenerating a fine pattern and the like on a still picture and thus is essential for making a high-resolution picture. However, in case of a moving picture, a high-band component of a luminance signal is greatly diminished and may even fade out because of the accumulative effect of a camera tube and the like. Thus, in relation to the moving picture, without using high resolution information, the regenerated picture quality is hardly affected. Accordingly, in the embodiment shown in FIG. 15, when the motion detecting circuit 27-1 serves to decide that the picture is a moving picture, the output of the converting circuit is made zero. Thus, in case of a moving picture, the high resolution information spectrum $Y_H'$ shown in FIG. 17B can be deleted. As a result, in the receiver side, the phenomenon in which the luminance signal $Y_L$ is regenerated as high resolution information can be controlled. Further, for a moving picture, the first and the third quadrant bands of the luminance signal are expanded so that the generation of obscure points can be reduced.

Figure 16:
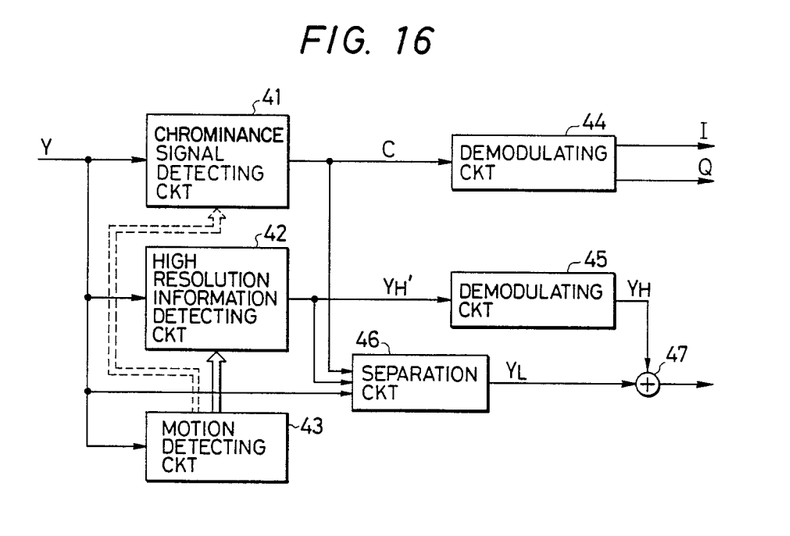
FIG. 16 is a block diagram showing a circuit for separating a luminance signal and color difference signals I and Q from the color television signal generated in the circuit shown in FIG. 15.

FIG. 16 is a block diagram showing an arrangement of one embodiment of a circuit for separating the video signal of a color television signal obtained by the embodiment shown in FIG. 15 into the luminance signal $Y(Y_H, Y_L)$ and the color difference signals I and Q.

A chrominance signal detecting circuit 41 and a high resolution information detecting circuit 42 respectively serve to detect a modulated chrominance signal C and high resolution information $Y_H'$ and a separation circuit 46 separates these components $Y_H'$ and C from the signal Y so as to detect the luminance signal $Y_L$. A motion detecting circuit 43 serves to discriminate the mode of a moving picture or a still picture. For a moving picture, the output of the high resolution information detecting circuit 42 is made zero.

The modulated chrominance signal C is demodulated into color difference signals I and Q by means of a demodulation circuit 44. Further, the high resolution information $Y_H'$ is demodulated into the original high-band luminance signal $Y_H$ by means of a frequency shift circuit 45. A multiplexing circuit 47 serves to multiply a $Y_L$ component with the luminance signal Y and demodulate it as a luminance signal.

Further, the chrominance signal detecting circuit 41 can detect a chrominance signal component by means of the computation between frames in a still picture mode or within a field in a moving picture mode and the like.

We claim:

1. A color television signal processing system comprising:
   first means for providing a linear-sequentially scanned luminance signal and a linear-sequentially scanned chrominance signal;
   motion detecting means for detecting motion of a picture from said linear-sequentially scanned luminance signal;
   a spatio-temporal filter for receiving as an input signal said linear-sequentially scanned luminance signal and for eliminating an aliasing component of said linear-sequentially scanned luminance signal so as to provide an output signal of said linear-sequentially scanned luminance signal without the aliasing component;
   switch means for selecting one of the input signal and the output signal of said spatio-temporal filter in response to an output of said motion detecting means;
   first scan converting circuit means for converting an output of said switch means into an interlaced scanned luminance signal and for providing an output signal thereof;
   second scan converting circuit means for converting said linear-sequentially scanned chrominance signal into an interlaced scanned chrominance signal and for providing an output signal thereof;
   modulating circuit means for modulating a color subcarrier by said interlaced scanned chrominance signal and for providing an output signal thereof; and
   second means for multiplexing output signals of said first scan converting circuit means and said modulating circuit means to provide a complex color television signal for transmission.

2. A color television signal processign system according to claim 1, wherein said motion detecting means comprises a temporal filter passing a temporal frequency band between one half a field frequency and a field frequency, a spatial filter connected in series with said temporal filter for passing a vertical frequency higher than one quarter of lines of a frame, and mode detecting circuit means for providing a control signal to said switch means to enable selection of the output signal of said spatio-temporal filter when an output of said series connected temporal filter and spatial filter is larger than a predetermined level.

3. A color television signal processing system according to claim 1, wherein said second means comprises separating means for separating a high frequency luminance signal and a first low frequency luminance signal from the output signal of said first scan converting circuit means, frequency converting means for converting said high frequency luminance signal into a second low frequency luminance signal and providing an output signal thereof, and multiplexing circuit means for multiplexing said first and second low frequency luminance signal and the output signal of said modulating circuit means.

4. A color television signal processing system according to claim 3, wherein said second means further comprises another spatio-temporal filter receiving as an input signal said first low frequency luminance signal and having a frequency characteristic for passign a high frequency component of a spatio-temporal frequency of said first low frequency luminance signal as an output signal, motion mode detection means for detecting modes of motion of picture from said first low frequency luminance signal and providing codes representing said modes of motion; and another switch means for selecting one of the input signal and the output signal of said another spatio-temporal filter and for adding the selected signal to said multiplexing circuit means.

5. A color television signal processing system, according to claim 4, wherein said multiplexing circuit means further includes control means for inhibiting transmission of the output signal of said frequency converting means when said codes represent a mode which generates crosstalk between said second low frequency luminance signal and said high frequency luminance signal.

* * * * *